Oct. 31, 1961  F. J. KOZACKA  3,007,019
CABLE PROTECTION
Filed Feb. 2, 1960  2 Sheets-Sheet 1

INVENTOR.
Frederick J. Kozacka
BY
Atty.

United States Patent Office 3,007,019
Patented Oct. 31, 1961

3,007,019
CABLE PROTECTION
Frederick J. Kozacka, South Hampton, N.H., assignor to The Chase-Shawmut Company, Newburyport, Mass.
Filed Feb. 2, 1960, Ser. No. 6,293
13 Claims. (Cl. 200—120)

This invention relates to the protection of cables.

It is one object of this invention to provide unitary protective devices which lend themselves to the protection of cables against relatively small overload currents of excessive duration as well as to the protection of cables against major fault currents.

Another object of the invention is to provide unitary protective devices capable of achieving time-current characteristics which match closely the smoke characteristics, danger temperature characteristics, or insulation damage characteristics of cables. These characteristics are time-current curves defining the particular times cables are allowed to carry predetermined overload currents without evolution of smoke from the insulation of the cables, or damage to the insulation of the cables.

Unitary prior art cable protectors, i.e. cable protectors lending themselves to the protection of cables against relatively small overload currents of excessive duration as well as to the protection of cables against major fault currents are not capable of achieving a close match between their time-current characteristic, or blowing characteristic, and the smoke characteristic, danger temperature characteristic, or insulation damage characteristic, of the cable to be protected. This limitation can be overcome by providing two separate devices adapted to be connected in series into an electric circuit, of which one device is adapted to achieve a time-current characteristic which matches closely the smoke characteristic, the danger temperature characteristic, or insulation damage characteristic of the cable when subjected to relatively small overload currents of excessive duration, while the other device lends itself to protection of cables against major fault currents. The use of separate, spaced devices, one for each of the two above functions, involves relatively high cost and relatively much space.

It is, therefore, another object of the invention to provide a unitary protector which is inexpensive to manufacture and which involves a minimum of bulk.

The cable protector according to this invention relies on alloy-forming overlays of a metal having a relatively low fusing point arranged on a ribbon fuse link made of a metal having a relatively high conductivity and a relatively high fusing point such as, for instance, silver or copper. Such overlays are generally considered as a means for achieving time delay or time lag. When a fuse link made of a high fusing point metal and a given current rating is subsequently provided with an overlay of a low-fusing point metal capable of effecting an interruption of the current path through the high fusing point base metal when and if the overlay metal reaches the fusing point thereof, a substantial decrease of the current rating of such a fuse link will be observed. In order to restore the initial current rating of the link, the cross-sectional area of the latter must be increased. As a result of such increase the blowing times of the fuse link are increased throughout the entire current range. The most intense derating of a fuse link occurs when the overlay is arranged in the center thereof where the temperature is highest when the link is carrying its normal load current or an overload current. The derating is less if the overlay is arranged more or less off center. I have discovered that the current rating of a link made of a high fusing point metal remains virtually unaffected when it is provided with an overlay arranged much off center very close to one of the terminal elements of the fuse of which the fuse link forms a part. This effect is particularly remarkable when the terminal elements of the respective fuse involve a relatively large mass of metal, e.g. when the terminal elements of the fuse are formed by massive metal plugs which are press-fitted in a fuse tube, or casing, of insulating material. It is thus possible to design a fuse link for the sole purpose of protecting a cable against the effects of major fault currents and to provide such a link with an alloy-forming overlay which is sufficiently remote from the section of the fuse link designed for the protection against major fault currents to have virtually no effect upon the operation of that section when carrying currents of load current proportions or when subjected to major fault currents. If such an overlay on a fuse link is caused to undergo substantially the same changes in temperature a cable undergoes when carrying overload currents, the link will be adapted for protection of the cable against relatively small currents of excessive duration, in addition to its initial function of protecting the cable against major fault currents.

For a better understanding of the invention reference may be had to the accompanying drawings illustrating several embodiments of the invention wherein FIG. 1 is a longitudinal section of a first embodiment taken along 1—1 of FIG. 2;

Figures 1, 2:
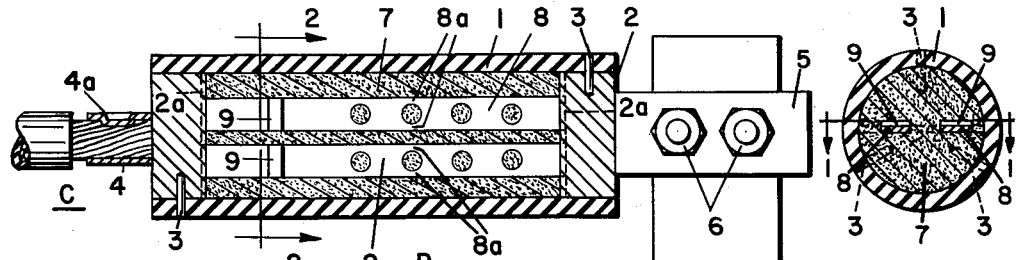
FIG. 2 is a section along 2—2 of FIG. 1.

Referring now to the drawings, and more particularly to FIGS. 1 and 2 thereof, reference character P has been applied to generally indicate a cable protector interposed between a cable C and a bus bar B. The cable protector P comprises a tubular casing 1 of an appropriate insulating material, e.g. a synthetic-resin-glass-cloth laminate. Casing 1 is closed on each end by one of a pair of terminal elements 2. Terminal elements 2 are formed by metal plugs which are press-fitted into casing 1 and maintained in position by means of a plurality of angularly displaced steel pins 3. The terminal plug 2 on the left side of the cable protector P comprises a tubular cable connector 4 receiving the bare end of cable C. Cable connector 4 forms an integral part of plug 2 and is provided with an indentation 4a produced with a manually operable hydraulic press for firmly maintaining the bare end of cable C in position and establishing a good conductive connection between the bare end of cable C and plug 2. The right plug 2 is provided with a blade contact 5 forming an integral part of that plug. Blade contact 5 is screwed against bus bar B by means of a pair of stud bolts 6. Casing 1 is filled with a pulverulent arc-quenching filler 7, e.g. quartz sand. Two ribbon type fuse links 8 of a metal having a relatively high fusing point and a relatively high conductivity are arranged in casing 1, immersed in filler 7 and conductively interconnect the terminal elements or plugs 2. To this end the axially inner end surfaces of plugs 2 are provided with grooves 2a which receive the ends of fuse links 8. High temperature solder (not shown), e.g. silver solder, is filled into grooves 2a to establish a current path of minimal resistance between plugs 2 and fuse links 8. Fuse links 8 are preferably made of sheet silver, but might also be made of sheet copper. Silver has a resistivity of $1.629 \cdot 10^{-6}$ ohm-centimeters at 18 deg. centigrade, whereas the resistivity of copper is $1.7241 \cdot 10^{-6}$ ohm-centimeters at 20 deg.

centigrade. Conductivity is the reciprocal of resistivity. The fusing point of silver is 961 deg. centigrade whereas the fusing point of copper is 1084 deg. centigrade. Each fuse link 8 defines a plurality of serially related points of reduced cross-sectional area 8a formed by a plurality of circular perforations.

The geometry of fuse links 8 imparts to them a certain predeterminable current carrying capacity or current rating. Fuse links 8 support at the left end thereof, i.e. at the end thereof to which cable C is connected, an overlay 9 of metal, e.g. tin, indium, or cadmium having a relatively low fusing point. Overlay 9 is in the form of a transverse bar and is positioned immediately adjacent the left plug 2 and sufficiently close to that plug to preclude a reduction of the current carrying capacity of the cable protector P and links 8 thereof, respectively, by virtue of the presence of overlay 9. In other words, the minimum fusing current of the cable protector P and of the links 8 thereof is virtually unaffected by the presence of overlay 9. To achieve this end as close as practically necessary a substantial space should be left between the point where the overlay 9 is located and the nearest point of reduced cross-sectional area 8a. The spacing between the nearest point 8a of reduced cross-sectional area and overlay 9 should exceed the spacing between contiguous points 8a of reduced cross-sectional area which points are spaced equidistantly from each other.

When the cable protector P is carrying current, each point of reduced cross-sectional area 8a forms a point where there is a temperature peak and the temperature profile of links 2 drops toward the terminal plugs 2. The temperature of plugs 2 is the ambient temperature, or close to the ambient temperature. Assuming cable C to have an infinite current carrying capacity, and that the current flowing through such cable C, cable protector P, and bus bar B to be progressively increased from a given minimum value; under such circumstances the temperature of the hottest spot on fuse links 8 which is situated to the right of the center of fuse links 8 will gradually rise until the fusing or melting point of the base metal is reached at that point, the fusing time depending upon the current which the cable protector is caused to carry. As long as the current carrying capacity of cable C is infinite, or its resistance zero, the temperature of the overlays 9 remains way below the fusing temperature of overlays 9, and relatively close to ambient temperature.

If the cable C has a current carrying capacity which is finite, i.e. a resistance which is above zero, the temperature at overlays 9 will rise as the current carried by cable C is increased. Heating of cable C is increased in proportion to the square of the current carried by cable C. The hotter the cable C, the steeper the rise in temperature at overlays 9. Under such circumstances the fusing point of overlays 9 will be reached before the hottest points of fuse links 8 reach the fusing point of the base metal. Hence the base metal will be severed and breaks will be formed at the points where overlays 9 are arranged. As a result, a pair of arcs will form at the points of break. These arcs are low-current arcs, and low-current arcs under extinction by a pulverulent arc-quenching medium require a fairly large back-burning distance before final arc extinction takes place. Under the circumstances under consideration arc extinction is a process requiring a relatively long period of time, say several cycles of an A.-C. current wave. Periods of time of this order are sufficient for heat exchange phenomena to take place. Therefore the relatively large mass of terminal plugs 2 exerts a beneficial cooling effect on the arc in the process of being extinguished, and this permits a relative reduction of the length of the section of links 8 situated to the left of overlay 9.

It is desirable to provide means arranged at a point of links 8 situated between overlays 9 and the left terminal element 2 for decelerating the speed of arc growth toward said terminal element. If the rate of burn-back in the direction to the left from overlays 9 can be reduced as, for instance, by the action of an appropriate blast of gas, to be but a fraction of the rate of burn-back in a direction to the right of overlays 9, the portions of links 8 situated to the right of overlays 8 are effectively utilized to establish the amount of arc voltage needed to achieve final arc extinction without danger of arcing into the left terminal element or plug 2. Means for decelerating the rate of burn-back in a direction toward the nearest terminal element or plug 2 will be considered more in detail in connection with FIGS. 4 to 6.

Figure 3:
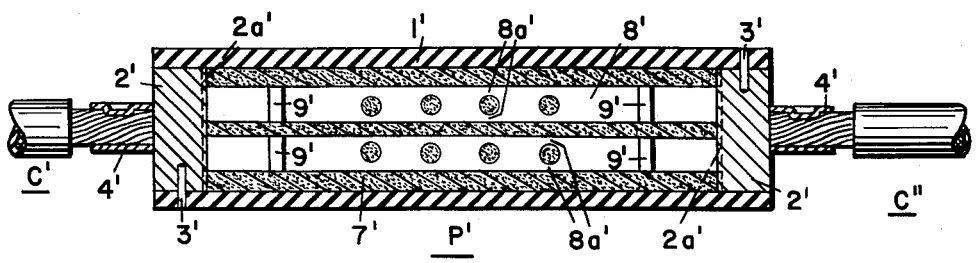
FIG. 3 is a longitudinal section similar to that shown in FIG. 1 of another embodiment of the invention.
Figure 4:
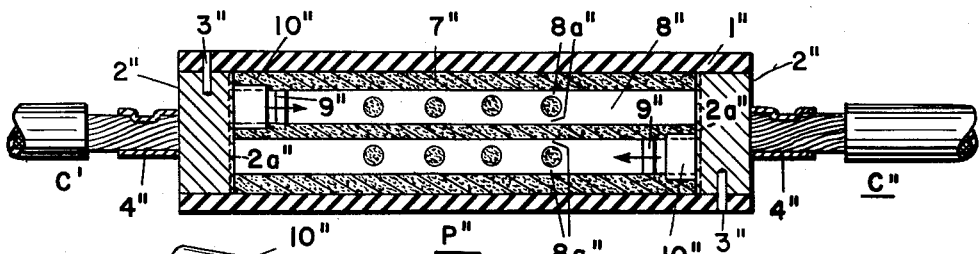
FIG. 4 is a longitudinal section similar to that shown in FIG. 1 of still another embodiment of the invention.

Referring now to FIGS. 3 and 4, these figures illustrate cable protectors which are designed to form a cable interconnector, i.e. to conductively interconnect a pair of cables C' and C''.

As shown in FIG. 3, the cable protector P' comprises a casing 1 of insulating material closed by terminal plugs 2' held in place by steel pin 3'. Both terminal plugs 2' are provided with tubular cable connectors 4' projecting axially outwardly from plugs 2' and forming an integral part thereof. Casing 1 is filled with a pulverulent arc-quenching filler in which fuse links 8' of silver or copper are immersed. Each fuse link 8' is provided with four circular perforations forming four serially related points 8a' of reduced cross-sectional area. The axially outer ends of links 8' are arranged in grooves 2a' provided in the axially inner surfaces of plugs 2' and conductively connected with plugs 2' by soft solder caused to flow into grooves 2a'. Each end of each link 8' is provided with an overlay 9' of a metal having a relatively low fusing point. Overlays 9' are arranged at points of links 8' sufficiently close to plugs 2' to closely follow in the load current and overload current range the temperature of plugs 2', and to be substantially unaffected by the temperatures prevailing adjacent the points 8a' of reduced cross-sectional area of links 8'. The two overlays 9' at the left end of cable protector P' closely follow the temperature of cable C' and of left plug 2', and the overlays 9' at the right end of cable protector P' closely follow the temperature of the cable C'' and of the right plug 2'. The temperature of overlays 9' at both ends of cable protector P' are hardly affected by the temperatures prevailing along the perforated portions or sections of links 8'. Cables C' and C'' may, or may not, be of the same size, and they may have, or may not have, the same smoke characteristics, danger temperature characteristics, or insulation damage characteristics. Assuming that the same current flows through cables C' and C'' and that cable C' is overloaded while cable C'' is of a different kind and is not overloaded; under such circumstances the overlays 9' at the left end of cable protector P' will fuse, affect the base metal of links 8' and thus initiate the interruption of the overloaded circuit. If both cables C' and C'' are overloaded, circuit interrupting breaks will be formed at both ends of cable protector P'.

The cable protector P'' shown in FIG. 4 comprises two fuse links 8'' arranged in a tubular casing 1'' filled with a pulverulent arc-quenching filler and closed by plugs 2''. Each of fuse links 8'' is provided with but one single overlay 9'' of a metal which has a lower melting point than the base metal, i.e. silver or copper, of which the fuse link is made. The cable protector shown in FIG. 4 is used preferably for protecting cables having the same overloading characteristics, i.e. the same smoke characteristic, or danger temperature characteristic, or insulation damage characteristic. When the cables C', C'' are overloaded, one break is formed on each of links 2'' at the point thereof where overlays 9'' are arranged. The tubular cable connectors 4'' forming integral parts of plugs 2'' each receive a bare end of one of cables C'', C'. The ends of links 8'' provided with overlays 9'' are surrounded by sleeves 10'' which may be of an organic insulating material or of boric acid. Sleeves 10'' are mounted on links 8'' at points situated between overlays 9" and plugs 2" and are arranged immediately adjacent to the respective overlay 9". These sleeves form barrier means adapted to release gas under the heat of arcs kindled at the points where overlays 9" are located. When these arcs burn back into the sleeves 10" blasts of gas are generated inside of sleeves 10" which escape preponderantly in a direction longitudinally of links 8", toward the center of links 8". The escape of gas generated inside of sleeves 10" in the opposite direction is substantially impeded by the presence of plugs 2", tending to close the axially outer ends of sleeves 10". The aforementioned blasts of gas increase the arc voltage at the points of break and retard back-burning of the fuse links toward plugs 2" situated immediately adjacent the respective point of break.

On occurrence of major fault currents, as distinguished from relatively small overload currents of inadmissible duration, the points where overlays 9, 9' and 9" are located remain relatively cool. Under such circumstances the points of reduced cross-sectional area $8a$, $8a'$, $8a''$ are rapidly heated to the melting point of the base metal of the fuse link, resulting in the formation of series break, one at each point $8a$, $8a'$, $8a''$ of reduced cross-sectional area.

Figure 5:
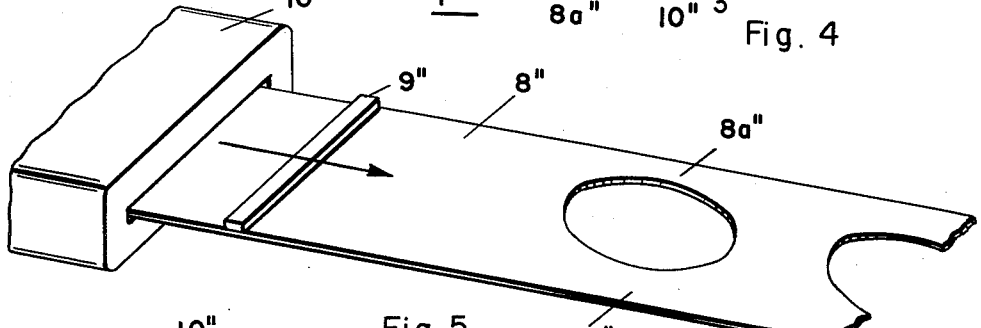
FIG. 5 is an isometric view of a detail of the structure of FIG. 4.

FIG. 5 shows on a larger scale the left end of upper link 8" of the structure of FIG. 4 with the gas-evolving sleeve 10" arranged immediately adjacent overlay 9".

Figure 6:
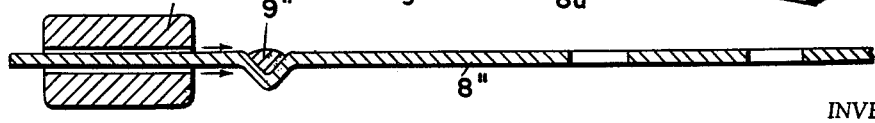
FIG. 6 is a longitudinal section of a modification of the detail shown in FIG. 5.

A similar arrangement is shown in FIG. 6 with an overlay 9" arranged in a transverse V-shaped groove formed by ribbon link 8".

The small arrows in FIGS. 4–6 indicate the direction of the arc-extinguishing blasts of arc-generated gas.

Figure 7:
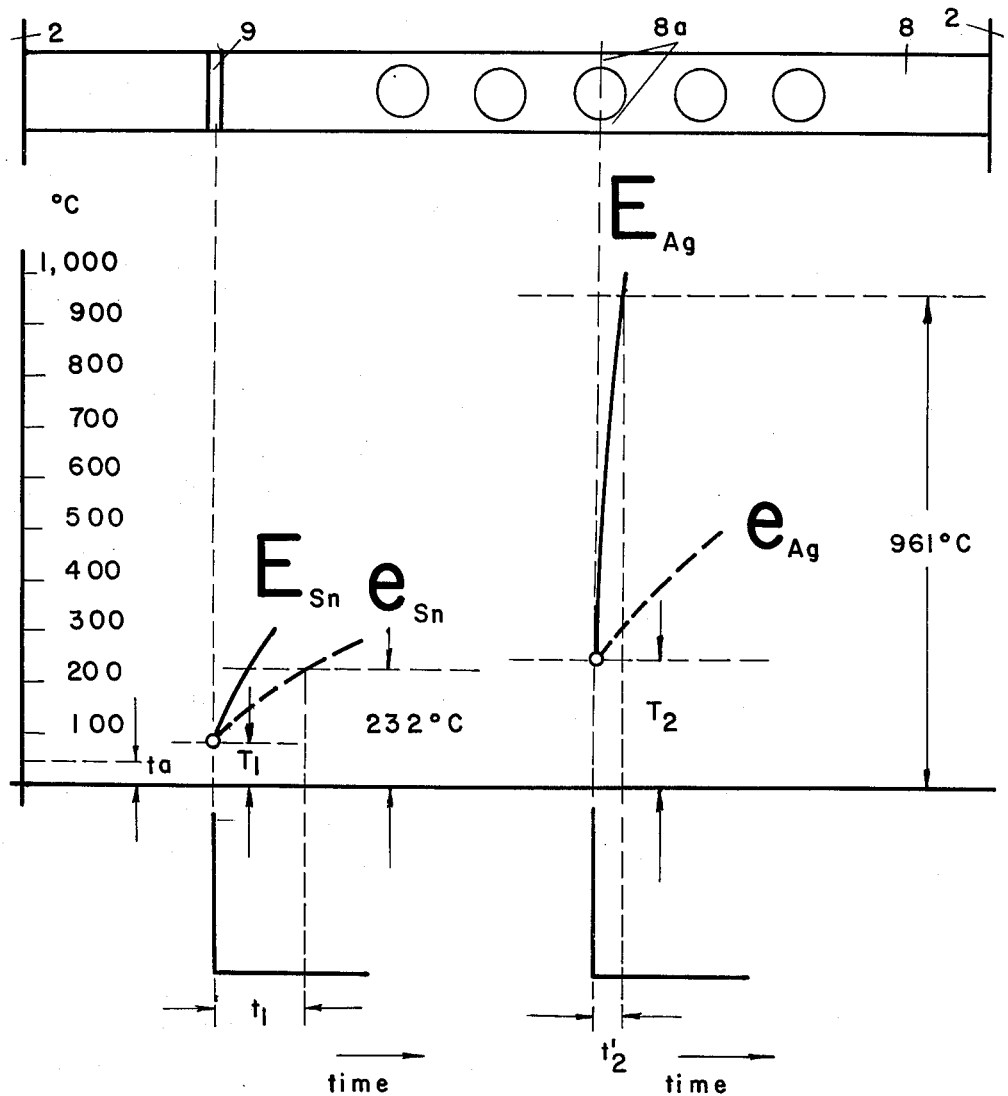
FIG. 7 is a diagram illustrating the mode of operation of cable protectors embodying the invention.

Referring now to FIG. 7, the upper portion thereof shows diagrammatically a cable protector including a silver link 8 having five circular perforations defining five points $8a$ of reduced cross-sectional area and supporting the alloy-forming overlay 9 of tin. The intermediate portion of FIG. 7 shows temperatures in deg. centigrade at the hottest point of the link 8 and at the point of link 8 where overlay 9 is arranged. The horizontal line at the level $T_1$ indicates the temperature of overlay 9 when the cable protector carries its rated current. It is apparent that $T_1 < 100°$ C. and only slightly higher than the ambient temperature $T_a$. The horizontal line at the level $T_2$ indicates the temperature of the hottest point of the cable protector when the latter carries its rated current. It is apparent that $T_2 > T_1$. On occurrence of a given overload current the temperature of overlay 9 rises according to the exponential function $e_{sn}$, whereas the temperature of the hottest point of link 8 rises according to the exponential function $e_{Ag}$. The fusing point of tin is 232 deg. centigrade and has been indicated by a horizontal line. Another horizontal line indicates the fusing point of silver which is 961 deg. centigrade. It is apparent that $e_{sn}$ intersects the horizontal fusing point line of tin after a time interval of $t_1$, whereas after an interval of $t_1 e_{Ag}$ is still well below the horizontal fusing point line of silver. On occurrence of a major fault current the temperature of overlay 9 rises according to the exponential function $E_{sn}$, whereas the temperature of the hottest point of link 8 rises according to the exponential function $E_{Ag}$. It is apparent that $E_{Ag}$ intersects the horizontal fusing point line of silver after a time interval of $t_2'$, whereas after an interval as short as $t_2' E_{sn}$ is still below the horizontal fusing point line of tin. The two points of origin of exponential functions $E_{sn}$, $e_{sn}$ and $E_{Ag}$, $e_{Ag}$ have two meanings. They are indicative of the location of the point under consideration within the cable protector structure, and they are points of origin of two systems of coordinates showing temperature plotted versus time. To suggest the latter significance of the above two points a pair of systems of rectangular coordinates has been added to the lower portion of FIG. 7.

Since many changes can be made in the foregoing structures and different embodiments of the invention be made without departing from the spirit thereof, it is intended that all matter shown in the accompanying drawings and described hereinbefore shall be illustrative and not limiting in any sense.

What is claimed as new is:

1. In combination a tubular casing of insulating material; a pair of terminal elements each closing one of the ends of said casing; tubular cable connecting means arranged on the outside of one of said pair of terminal elements and forming an integral part thereof; a pulverulent filler inside said casing; a ribbon fuse link of a metal having a relatively high conductivity and a relatively high fusing point arranged inside said casing, immersed in said filler and conductively interconnecting said pair of terminal elements, said link defining a plurality of serially related points of reduced cross-sectional area and having a predetermined current carrying capacity; and an alloy-forming overlay of a metal having a relatively low fusing point on said link, said overlay being arranged at a point of said link immediately adjacent said one of said pair of terminal elements and sufficiently close to said one of said pair of terminal elements to substantially preclude a reduction of said current-carrying capacity by virtue of the presence of said overlay.

2. A combination as specified in claim 1 wherein each of said pair of terminal elements is provided with a tubular cable connecting means and wherein an alloy-forming overlay is arranged adjacent each end of said link.

3. A combination as specified in claim 1 comprising means operatively associated with said link and arranged at a point thereof situated between said overlay and said one of said pair of terminal elements for decelerating the speed of arc-gap-growth toward said one of said pair of terminal elements.

4. In combination a tubular casing of insulating material; a pair of terminal plugs press-fitted into said casing each closing one of the ends thereof; a tubular cable connector projecting axially outwardly from the outside of one of said pair of plugs and forming an integral part thereof; a pulverulent filler inside said casing; a ribbon fuse link of a metal having a relatively high conductivity and a relatively high fusing point arranged inside said casing, immersed in said filler and conductively interconnecting said pair of terminal plugs, said link defining a plurality of serially related points of reduced cross-sectional area; and an alloy-forming overlay of a metal having a relatively low fusing point on said link, said overlay being arranged at a point of said link situated between said one of said pair of plugs and said plurality of points of reduced cross-sectional area and sufficiently close to said one of said pair of plugs to closely follow in the load current range the temperature of said one of said pair of plugs without being significantly affected by the temperatures prevailing adjacent said plurality of points of reduced cross-sectional area.

5. In combination a tubular casing of insulating material; a pair of terminal plugs press-fitted into said casing each closing one of the ends thereof; a tubular cable connector projecting axially outwardly from one of said pair of plugs and forming an integral part thereof; a cable having one end inserted into and conductively connected to said connector; a blade contact on the outside of the other of said pair of plugs and forming an integral part thereof; a bus bar arranged transversely to and conductively connected with said blade contact; a pulverulent filler inside said casing; a ribbon fuse link of a metal having a relatively high conductivity and a relatively high fusing point arranged inside said casing, immersed in said filler and conductively interconnecting said pair of plugs, the end of said link adjacent said bus bar defining a plurality of serially related points of reduced cross-sectional area; and an alloy-forming overlay of a metal having a relatively low fusing point on said link, said overlay being arranged at the end of said link adjacent said cable at a point of said link situated between said plurality of serially related points of reduced cross-sectional area and said one of said pair of plugs.

6. In combination a tubular casing of insulating material; a pair of terminal plugs press-fitted into said casing each closing one of the ends thereof; a pair of tubular cable connectors each projecting axially outwardly from one of said pair of plugs and forming an integral part thereof; a pair of cables each inserted with one end thereof into and conductively connected to one of said pair of connectors; a pulverulent filler inside said casing; a pair of ribbon fuse links of a metal having a relatively high conductivity and a relatively high fusing point arranged inside said casing, immersed in said filler and conductively interconnecting said pair of plugs, each of said pair of links defining a plurality of serially related points of reduced cross-sectional area; and a pair of alloy-forming overlays having a relatively low fusing point each arranged on one of said pair of links and each arranged adjacent one of the ends of said casing in the space between one of said pair of plugs and said plurality of points of reduced cross-sectional area.

7. In combination a tubular casing of insulating material; a pair of terminal elements each closing one of the ends of said casing; tubular cable connecting means on the outside of one of said pair of terminal elements and forming an integral part thereof; a pulverulent filler inside said casing; a ribbon fuse link of a metal having a relatively high conductivity and a relatively high fusing point arranged inside said casing, immersed in said filler and conductively interconnecting said pair of terminal elements, said fuse link defining a plurality of serially related points of reduced cross-sectional area; and an alloy-forming overlay of a metal having a relatively low fusing point on said link, said overlay being arranged at a point of said link situated between said tubular connecting means and the point of reduced cross-sectional area of said plurality of points of reduced cross-sectional area closest to said tubular connecting means.

8. A combination as specified in claim 7 comprising means of an organic insulating material arranged immediately adjacent said link at a point thereof situated between said overlay and said tubular connecting means.

9. In combination a tubular casing of insulating material; a pair of terminal elements each closing one of the ends of said casing; connecting means adapted to receive the end of a cable arranged on the outside of one of said pair of terminal elements and forming an integral part thereof; a pulverulent filler inside said casing; a ribbon fuse link of a metal having a relatively high conductivity and a relatively high fusing point arranged inside said casing, immersed in said filler and conductively interconnecting said pair of terminal elements, said fuse link defining a plurality of serially related points of reduced cross-sectional area; an alloy-forming overlay of a metal having a relatively low fusing point on said link, said overlay being arranged at a point of said link situated between said one of said pair of terminal elements and the point of reduced cross-sectional area of said plurality of points of reduced cross-sectional area closest to said one of said pair of terminal elements; and a barrier means adapted to release gas when exposed to the heat of an arc, said barrier means being interposed between said overlay and said one of said pair of terminal elements.

10. In combination a tubular casing of insulating material; a pair of terminal elements each closing one of the ends of said casing; tubular cable connecting means on the outside of one of said pair of terminal elements and forming an integral part thereof; a pulverulent arc-quenching filler inside said casing; a ribbon fuse link of a metal having a relatively high conductivity and a relatively high fusing point arranged inside said casing, immersed in said filler and conductively interconnecting said pair of terminal elements, a portion of the length of said link being serially multiperforated; and an alloy-forming overlay of a metal having a relatively low fusing point arranged in an area of said link apart from said multiperforated portion thereof and arranged sufficiently close to one of said pair of terminal elements to closely follow the temperature of said one of said pair of terminal elements.

11. In combination a tubular casing of insulating material; a pair of terminal elements each closing one of the ends of said casing; a pair of tubular cable connecting means each on the outside of one of said pair of terminal elements and forming an integral part thereof; a pulverulent arc-quenching filler inside said casing; a ribbon fuse link of a metal having a relatively high conductivity and a relatively high fusing point arranged inside said casing, immersed in said filler and conductively interconnecting said pair of terminal elements, said link defining a plurality of serially related points of reduced cross-sectional area; and a pair of alloy-forming overlays of a metal having a relatively low fusing point on said link, each of said pair of overlays being arranged in an area of said link situated between one of said pair of terminal elements and one of said plurality of points of reduced cross-sectional area immediately adjacent said one of said pair of terminal elements.

12. In combination a tubular casing of insulating material; a pair of terminal elements each closing one of the ends of said casing; a pair of cable connecting means each on the outside of one of said pair of terminal elements and forming an integral part thereof; a pulverulent arc-quenching filler inside said casing; a pair of ribbon fuse links of a metal having a relatively high conductivity and a relatively high fusing point arranged inside said casing, immersed in said filler and conductively interconnecting said pair of terminal elements, each of said pair of fuse links having a plurality of serially related perforations; a pair of alloy-forming overlays of a metal having a relatively low fusing point, each of said pair of overlays being supported by one of said pair of links and each arranged outside the length of said one pair of links occupied by said plurality of perforations and immediately adjacent to one of said pair of terminal elements.

13. In combination a tubular casing of insulating material; a pulverulent filler inside said casing; a pair of terminal plugs each closing one of the ends of said casing; groove means defined by the axially inner surfaces of said pair of plugs; tubular cable connecting means arranged outside of one of said pair of plugs and forming an integral part thereof; a ribbon fuse link of a metal having a relatively high conductivity and a relatively high fusing point arranged inside said casing, immersed in said filler and extending with the ends thereof into said groove means; said link defining a plurality of serially related points of reduced cross-sectional area and having a predetermined current carrying capacity; high temperature solder joints formed inside said groove means for conductively connecting said link to said pair of plugs; and an alloy-forming overlay of a metal having a relatively low fusing point on said link, said overlay being arranged at a point of said link immediately adjacent said one of said pair of plugs and sufficiently close to said one of said pair of plugs to substantially preclude a reduction of said current-carrying capacity by virtue of the presence of said overlay.

References Cited in the file of this patent

UNITED STATES PATENTS

| | | |
|---|---|---|
| 2,594,315 | Kozacka | Apr. 29, 1952 |
| 2,658,974 | Kozacka | Nov. 10, 1953 |
| 2,678,980 | Hitchcock | Nov. 18, 1954 |
| 2,794,099 | Swain | May 28, 1957 |
| 2,800,554 | Dannennberg et al. | July 23, 1957 |
| 2,837,614 | Fister | June 3, 1958 |